United States Patent

[11] 3,615,990

| [72] | Inventors | Eugene B. Butler<br>Kent;<br>Walter T. Reilly, Cuyahoga Falls; Gerald E. Whorley, Ashtabula, all of Ohio |
|---|---|---|
| [21] | Appl. No. | 844,010 |
| [22] | Filed | July 23, 1969 |
| [45] | Patented | Oct. 26, 1971 |
| [73] | Assignee | The General Tire & Rubber Company |

[54] SURFACE CHARACTERISTICS OF COMPOSITE FABRICS
4 Claims, 6 Drawing Figs.

[52] U.S. Cl. .................................................. 156/148, 28/72.2, 156/153
[51] Int. Cl. .................................................. D04h 1/46
[50] Field of Search .................................................. 28/72.2; 156/148, 91, 61, 153, 154, 212; 161/80, 81; 117/142

[56] References Cited
UNITED STATES PATENTS
| 2,705,497 | 4/1955 | Johnson et al. .............. | 156/153 X |
| 2,847,086 | 8/1958 | Muller .......................... | 28/72.2 |
| 2,994,617 | 8/1961 | Proctor ........................ | 28/72.2 X |
| 3,067,483 | 12/1962 | Hollowell .................... | 28/80 |
| 3,383,273 | 5/1968 | Pearson et al. .............. | 28/72.2 X |

FOREIGN PATENTS
| 1,040,572 | 9/1966 | Great Britain ............... | 156/148 |

Primary Examiner—Benjamin R. Padgett
Assistant Examiner—E. E. Lehmann
Attorneys—Frank C. Rote, Jr. and Harry F. Pepper, Jr.

ABSTRACT: In the production of a substitute leather material, a laminate of a nonwoven batt needled to the backside of a knit or woven fabric is often used as a substrate or support. During needling, loops and strands of the batt are drawn through the fabric by the needles, resulting in a large number of fiber ends and loops projecting from the surface and forming a visible linear pattern. The surface of the fabric is brushed at an acute angle to the pattern of the projections to mask the pattern and level the projections thereby producing a smoother, more uniform surface finish. Buffing of the surface prior to brushing serves to break the projecting loops thereby facilitating the brushing operation.

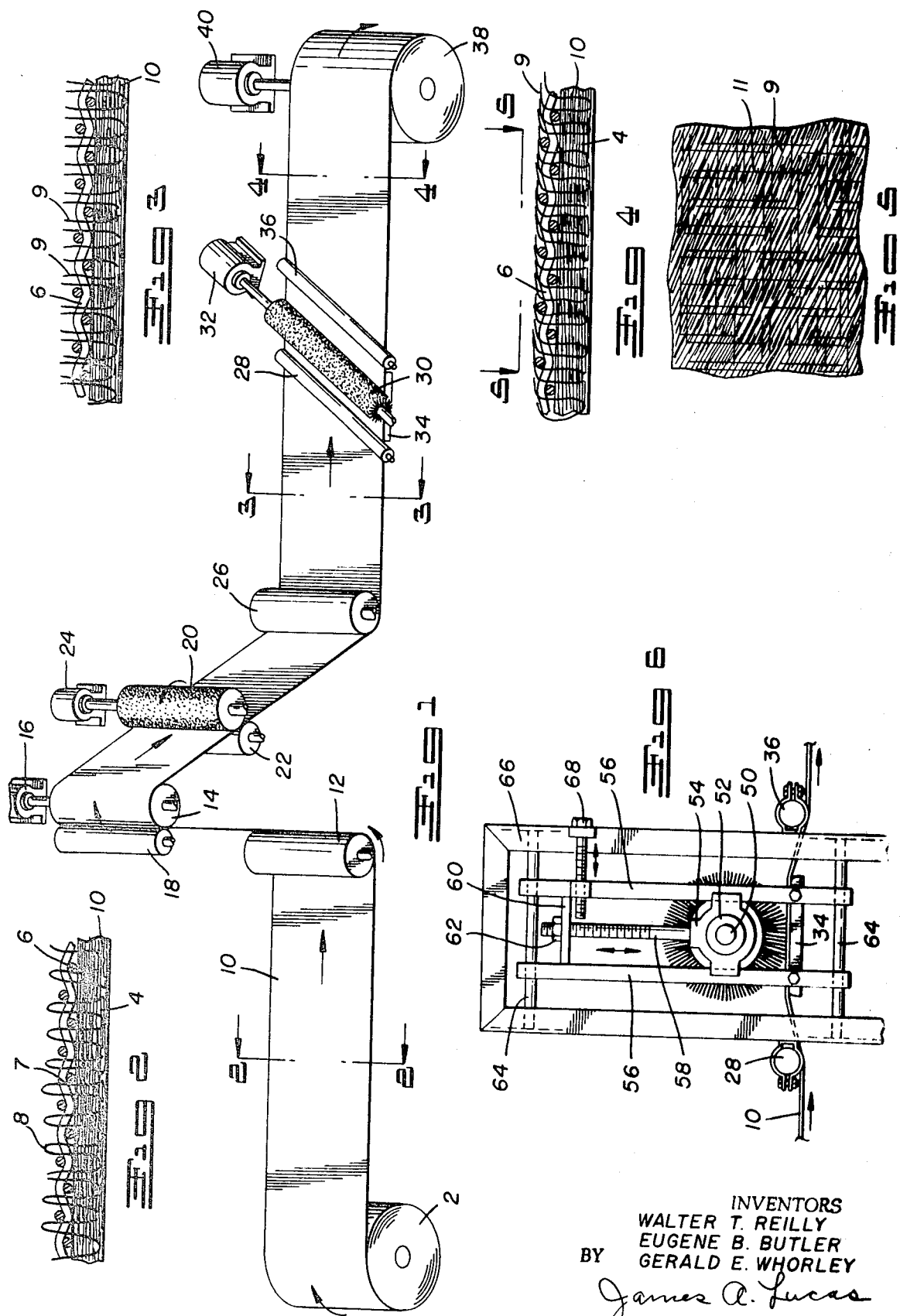

SURFACE CHARACTERISTICS OF COMPOSITE FABRICS

SUMMARY OF THE INVENTION

Various synthetic and simulated leather materials have been commercially available for several years. These materials have advantages over natural leather, one of which is the fact that the materials can be made in a wide range of colors and surface patterns. Furthermore, the various physical properties of the materials such as the porosity, breathability, strength, feel and abrasion resistance can be closely controlled.

The synthetic materials are generally produced by saturating and/or covering a suitable substrate with one or more polymers formulated to impart scuff and water resistance to the final product. As an example, a substrate is prepared by laminating a bulky nonwoven batt onto the back of a suitable woven or knit fabric. The union is accomplished by passing the materials together through a needling machine consisting of a large number of needles which punch the fibers of the nonwoven material through the fabric. The needling machine produces several hundred or several thousand perforations per square inch depending upon the number of passes of the materials therethrough. The nonwoven fabric adds bulk and weight to the material and improves certain of its physical properties. Difficulty arises, however, for example, when in the manufacture of a heavy-needled substrate for use in shoes and the like, the material is passed through the needling machine several times. This repetition results in the formation of numerous surface projections in the material and these projections form a pattern that is visible in the final product after the application of the polymeric coating. This pattern becomes even more pronounced when the finished material is stretched and deformed for example in the formation of the toes and heels of shoes.

It is one object of the present invention to eliminate these visible surface patterns during stretching of the fabric as in the manufacture of shoes.

It is another object to mechanically treat the substrate to produce a smoother, more uniform surface.

It is another object of this invention to brush the exposed surface of a heavy-needled substrate so as to lay down the fibers at an angle to the linear pattern caused by needling.

These and other objects are accomplished in the manner to be hereinafter described with particular reference to the attached sheet of drawings wherein:

FIG. 1 is a perspective flow diagram of the process of the present invention;

FIG. 2 is a cross section along lines 2—2 of FIG. 1 showing a nonwoven batt needled onto a woven or knit fabric with numerous loops projecting from the surface of said fabric;

FIG. 3 is a cross section through lines 3—3 of FIG. 1 showing the composite fabric after it has been buffed to break the loops and clumps of fibers projecting above the surface of the woven fabric;

FIG. 4 is a cross-sectional view taken along lines 4—4 of FIG. 1 after the fibers have been brushed down;

FIG. 5 is a top view of the fabric, taken along lines 5—5 of FIG. 4; and

FIG. 6 is an end view of a typical brushing wheel mounted for vertical and horizontal movement within an appropriate structural framework.

DETAILED DESCRIPTION OF THE INVENTION

The appearance of a synthetic leather material comprising a polymer-coated composite fabric substrate is improved by brushing the surface of the substrate at an acute angle from the direction of the regular needling pattern formed by the loops and strands of the nonwoven batt projecting above the surface of the fabric. The brushing serves to displace the fibers at an angle to the needling pattern. If the projections are composed primarily of individual loops, these loops are preferably broken by passage of the material through a buffing wheel prior to brushing.

Referring now to FIG. 1, there is shown a letoff roll 2 of a composite fabric to be processed according to the teachings of the present invention, said composite fabric comprising a nonwoven batt which has been united to the back of a suitable supporting fabric by needling. The invention is not limited to a specific composite of the nonwoven batt and fabric. Instead, this batt can be produced for example from any one of a number of synthetic polymeric filament forming compositions such as polyamides, polyesters, polyurethanes, acrylonitrile, polyesteramides, vinyl polymers as well a proteinaceous and cellulosic polymers. Other natural and synthetic materials comprising fibers intertwined in a random orientation can also be used. The woven or knit fabric can be selected from the group consisting of plain, drills, twills, satins, ducks, jersey or tricot. Either natural or synthetic fibers can be used for this fabric.

The nonwoven batt is mated to the woven or knit fabric by needling on a needling loom or machine which contains a large number of closely spaced-parallel reciprocating needles which catch or drag the filaments or strands of the nonwoven material through the fabric. Normally, the laminate is passed through the loom a number of times to insure that the nonwoven batt is securely anchored to the back side of the fabric.

FIG. 2 shows a laminate 10 composed of a nonwoven batt 4 needled through a suitable woven or knit material 6. This batt is normally composed of a large number of randomly oriented discontinuous fibrous strands. As a result of needling, many of these strands 7 project through and extend beyond the surface of the woven or knit fabric 6 forming a plurality of loops 8.

Referring again to FIG. 1 the composite fabric 10 passes around a first guide roll 12 and then around a dwell roll 14 driven by a suitable motor 16. A rubber pressure roll 18 maintains a constant pressure against the composite 10 as it passes around the dwell roll. The composite then passes between a buffing wheel 20 and a rubber backup roll 22, said buffing wheel 20 rotating generally in the same direction but at a greater speed than that of the composite. Suitable means such as a variable speed motor 24 are used to drive the buffing wheel.

FIG. 3 is an enlarged cross-sectional view of the composite after passing through the buffing wheel. It shows that the loops 8 shown in FIG. 2 have been broken, with the ends of the individual fiber strands 9 projecting through and beyond the surface of the fabric 10. If the fabric as needled does not contain a plurality of projecting loops 8 as seen in FIG. 2, but instead contains a large number of individual strands 9 as shown in FIG. 3, the buffing operation may be omitted. The presence of a small percentage of unbroken loops will not normally adversely affect the beneficial results obtained by brushing.

Again, in FIG. 1, after the composite passes through the buffing wheel, it passes around a second guide roller 26 and under a dwell bar 28 and beneath a brushing wheel 30. This brushing wheel is set at an acute angle relative to the direction of movement of the fabric and is rotated at several times the linear speed of the fabric by motor 32. The acute angle is desirably between about 15° and about 75° and more preferably between about 30° and 60° A backup plate 34 provides a solid support for the fabric as it is being brushed. The material after brushing passes under a second dwell bar 36 and then to a takeup roll 38 driven by a suitable means such as motor 40.

FIGS. 4 and 5 show the finished composite fabric after the individual projecting strands 9 of the batt 4 have been brushed down and caused to lie flat against the surface of the woven or knit fabric 6 as shown in FIG. 5. These fibers are all inclined in the same linear direction, forming an angle of about 30° with the direction of movement of the composite through the machine and with the needle pattern 11. It is understood, of course, that the brushing wheel is set at such an angle that the fibers are made to form an acute angle with the regular needle pattern which may in some instances not lie in the same direction as the linear movement of the composite through the brushing equipment.

FIG. 6 shows the details of one form of mounting bracket that can be used to support the free end of the brushing wheel. The shaft 50 of the brushing wheel is mounted in an appropriate bearing 52 secured in a pillow block 54 adapted to slide vertically along a pair of perpendicular vertical guides 56. The vertical adjustments of the brush is controlled by a threaded rod 58 extending through a spacer bar 60 and having a nut 62 threaded onto the end thereof. Rotation of the nut will cause movement of the threaded rod and the brush in a vertical direction. The guides 56 are themselves slidably mounted for horizontal movement along a pair of cross braces 64 secured to a rigid frame 66 fabricated out of angle iron or the like. The end of the brush can be moved in a horizontal direction to change the angle thereof with respect to the composite fabric 10 passing therethrough, by rotation of the angular adjustment rod 68. This rod causes the guides 56 to move along the cross braces 64.

Where a buffing step is necessary, the composite material can be buffed by any of the well-known processes using commercially available machines. For example, a Curtin Herbert drum abrader, utilizing a 12-or 14-inch drum, capable of rotating at a speed of 1,000 to 1,500 times the speed of the fabric moving through the abrader, can be used. The relative speed of the buffing surface to the fabric must be sufficiently great to break the loops of the individual fibers of the nonwoven batt that are projected above the fabric but is normally less than 1,000 to 1. The surface of the abrader can be composed of any suitable material that is capable of producing the desired results. For example, the surface may be etched or machined or alternatively may be covered with an appropriate abrasive material such as sand paper or grit to provide the right type of finish for buffing. A wire or stiff fiber brush or drum can be used. As shown in FIG. 1 the buffing wheel is rotated in the same direction as the movement of the composite fabric. It is not essential, however, that it rotate in this direction. Instead, it can rotate in the opposite direction, while accomplishing the necessary objective of breaking the individual loops of the nonwoven batt that are needled through the fabric.

It has been found that a 6-inch diameter brushing wheel composed of 1 ½-inch radially projecting nylon bristles is suitable for brushing the fibers and achieving proper orientation. The invention is not limited to the use of this particular kind of brush. Other types of brushes can likewise be used. Furthermore, the brushing wheel can rotate in a direction generally opposite to that shown in FIG. 1 to accomplish the necessary orientation. The speed of rotation of the brush should be great enough so that the relative movement thereof, with respect to the movement of the composite is sufficient to accomplish the desired results. Ratios as high as 1,000 to 1 have been found to be satisfactory. However, much lower speeds are normally employed. Brushing on a bias can be accomplished by positioning the brush at a given acute angle to the movement of the fabric or alternatively by using a brush on which the bristles are arranged spirally or helically therearound.

The buffing wheel and the brushing wheel can each be directly or indirectly driven by a variable or constant speed motor, and the speed of rotation can be controlled by regulating the speed of the motor or by use of appropriate variable speed gear boxes or drives.

It has been found that the action of the dry nylon bristles against the fibers produces a buildup of static electricity and causes fibers that are pulled from the composite to be tossed into the air. The drawbacks are overcome by spraying a thin coating of methyl cellulose (1-2 percent aqueous solution) onto the composite fabric immediately before brushing. A sufficient amount of the solution is applied to wet the brush thereby preventing this buildup of static electricity. The coating further serves to keep the fibers oriented and in place during and after brushing.

The following example is presented to illustrate a typical embodiment of the invention. In the production of an artificial leather material for use in the manufacture of men's shoes, a nonwoven batt consisting of randomly oriented polyester fibers and having an average thickness of 1.5 inches is needled into a square woven cotton sheeting by passing the two materials together through a standard needling machine. A total of three passes through the machine, resulting in 2,700 perforations per square inch results in a final structure having a weight of about 10 ounces per square yard and having a large number of loops of the batt projecting about 0.010 to 0.035 inches above the surface of the cotton fabric. The composite is then passed by a Curtin Herbert drum abrader at a rate of 12 feet per minute and is buffed with a 14-inch diameter abrader wheel rotating at 100 r.p.m. and covered with a fine grain carborundum paper.

The buffed fabric is then fed a speed of 8 8 feet per second past a 6-inch brushing wheel rotating at 1,725 r.p.m. The surface of the wheel is composed of 1 and ½-inch radially projecting nylon bristles. The angle between the wheel and the direction of movement of the fabric is about 30°. Immediately before brushing, a 2 percent aqueous solution of methyl cellulose is sprayed onto the fabric. The composite fabric is then dried and is immersed in a saturant solution composed of a polyurethane, Dimethylformamide and methanol. When the fabric is completely saturated, it is squeezed to remove excess saturant followed by evaporation of the solvent, after which the fabric is dried and buffed. A main coating of a mixture of polyurethane, and a vinyl chloride in a dimethylformamide solvent is then extruded or coated onto the surface of the woven fabric, after which the coating is jelled and the solvent removed therefrom. The coated fabric is then typically embossed to obtain the desired surface effect.

The surface of the coated fabric is very smooth and uniform when stretched over the last in the manufacture of shoes. There is no visible evidence of an undesirable surface pattern thereon.

Although the above example describes the steps of saturating the substrate followed by the application of a main coating and embossing, the present invention should not be limited to or interpreted in light of these various postbrushing operations. Furthermore, as previously stated, where projections produced by needling are composed primarily of fiber ends and not loops, the buffing step may be omitted since the principal purpose of buffing is to break the loops.

A plurality of brushes may be used in series to brush the surface where this is found to give better results than that obtained with one brush. These brushes may operate independently of one another or in concert. They may rotate at the same or at different speeds, and at the same or at different angles. The length, type and stiffness of the bristles on one brush may be identical to those on all of the other brushes or they may be different.

This invention has been described with respect to a nonwoven batt needled to a woven or knit fabric. It is applicable whenever a nonwoven material is needled resulting in the formation of a large number of surface loops or an undesirable surface pattern. Thus, it can be applied to a nonwoven batt that is not laminated to a surface fabric but which is nevertheless needled to densify and add strength thereto. It likewise applies to a sandwich construction with a layer of fabric embedded within the nonwoven structure or with the nonwoven batt positioned between two layers of fabric. In the latter case, if the nonwoven material is needled to both fabrics, multiple buffing and brushing steps may be required.

There are many other factors relating to the design and operation of the equipment and the carrying out of the operation that can be altered or varied without deviating from the present invention which is defined by the following claims in which:

I claim:

1. In the continuous production of a leather substitute for subsequent coating with a smooth, wear-resistant top coat, having a smooth surface finish from a woven or knit fabric in which a nonwoven batt is united to the underside of said fabric by needling thereto and through which said needled fibers project to form an undesirable visible pattern on said fabric surface that is pronounced in the direction of product travel, the improvement comprising eliminating said undesirable pattern by a method comprising the steps of:
- a. applying an air-dryable sizing material to said pattern; and,
- b. brushing said projecting fibers flat to said pattern while the fibers are still wet with said sizing material at an angle of between about 15° to about 75° with respect to the direction of fabric travel in such a manner to form a smooth surface.

2. The improvement of claim 1 wherein said angle of brushing is between about 30° to about 60° with respect to the direction of fabric travel.

3. The improvement of claim 1 wherein said air-dryable sizing material comprises an aqueous solution of methylcellulose.

4. The improvement of claim 1 including the preliminary step of first breaking any loops formed by said projecting fibers by buffing said visible pattern with a rotating buffing wheel to break any loops formed by said projecting fibers.

* * * * *

PO-1050
(5/69)

UNITED STATES PATENT OFFICE
CERTIFICATE OF CORRECTION

Patent No. 3,615,990  Dated October 26, 1971

Inventor(s) Butler et al

It is certified that error appears in the above-identified patent and that said Letters Patent are hereby corrected as shown below:

Column 1, line 11, the phrase "The synthetic" should read --These synthetic--.
Column 3, line 67, the phrase "The drawbacks" should read --These drawbacks--.
Column 4, line 15, the phrase "fed a speed of 88 feet" should read --fed at a speed of 8 feet--.

Signed and sealed this 18th day of April 1972.

(SEAL)
Attest:

EDWARD M. FLETCHER, JR.
Attesting Officer

ROBERT GOTTSCHALK
Commissioner of Patents